(12) United States Patent
Prin et al.

(10) Patent No.: US 7,160,838 B1
(45) Date of Patent: Jan. 9, 2007

(54) METAL OXIDE-COATED SIC FOAM CARRIERS FOR CATALYSTS, AND CATALYTIC SYSTEMS THEREFOR

(75) Inventors: Marie Prin, Saint Cassien (FR); Pascal Hervieu, Beaucroissant (FR)

(73) Assignee: Centre National de la Recherche Scientifique, Paris (FR)

(*) Notice: Subject to any disclaimer, the term of this patent is extended or adjusted under 35 U.S.C. 154(b) by 1119 days.

(21) Appl. No.: 09/101,451

(22) PCT Filed: Jan. 24, 1997

(86) PCT No.: PCT/FR97/00143

§ 371 (c)(1),
(2), (4) Date: Sep. 15, 1998

(87) PCT Pub. No.: WO97/26988

PCT Pub. Date: Jul. 31, 1997

(30) Foreign Application Priority Data

Jan. 26, 1996 (FR) .................... 96 01181

(51) Int. Cl.
*B01J 27/224* (2006.01)
*B01J 23/10* (2006.01)

(52) U.S. Cl. .............. 502/304; 502/326; 502/302; 502/407; 502/437

(58) Field of Classification Search .......... 502/304, 502/326, 302, 407, 439
See application file for complete search history.

(56) References Cited

U.S. PATENT DOCUMENTS

| | | | | |
|---|---|---|---|---|
| 3,985,854 A | * | 10/1976 | Bradford et al. | 423/22 |
| 3,993,572 A | * | 11/1976 | Hindin et al. | 502/304 |
| 4,283,308 A | * | 8/1981 | Ohara et al. | 502/213 |
| 4,849,275 A | * | 7/1989 | Hamaguchi et al. | 428/116 |
| 5,108,978 A | * | 4/1992 | Durand et al. | 502/304 |
| 5,208,380 A | * | 5/1993 | Shimizu et al. | 564/509 |
| 5,326,633 A | * | 7/1994 | Clough et al. | 428/288 |
| 5,429,780 A | * | 7/1995 | Prin et al. | 264/4 |
| 5,460,759 A | * | 10/1995 | Dubots | 423/345 |
| 5,688,740 A | * | 11/1997 | Bolshakov et al. | 502/326 |
| 5,739,075 A | * | 4/1998 | Matusz | 502/302 |
| 5,856,263 A | * | 1/1999 | Bhasin et al. | 502/333 |
| 5,945,369 A | * | 8/1999 | Kimura et al. | 502/304 |

FOREIGN PATENT DOCUMENTS

| | | | | |
|---|---|---|---|---|
| WO | 95-09687 | * | 4/1995 | 502/304 |

* cited by examiner

*Primary Examiner*—Ngoc-Yen Nguyen
(74) *Attorney, Agent, or Firm*—Dennison, Schultz & MacDonald (57) ABSTRACT

A catalyst carrier including a surface layer of oxygen-donating oxide, particularly cerine, is disclosed. A catalytic phase deposited on said carrier generally includes platinum and rhodium, thus forming a catalytic system for exhaust pipes, said catalytic phase being readily recoverable by simple leaching.

26 Claims, 5 Drawing Sheets

METAL OXIDE-COATED SIC FOAM CARRIERS FOR CATALYSTS, AND CATALYTIC SYSTEMS THEREFOR

FIELD OF THE INVENTION

The invention concerns catalysts, in particular high surface area catalyst supports, and more particularly supports of silicon carbide, SiC.

DESCRIPTION OF RELATED ART

The manufacture of SiC foams for the production of catalyst supports for the treatment of exhaust gases is already known, in particular from French patent application FR-A1-2 705 340.

Catalytic converters for internal combustion engines are usually formed from a ceramic support, typically of dense and compact cordierite. The support is then treated to form a deposit of alumina which adheres to the cordierite support and is known as a wash coat. An active catalytic phase is deposited on the alumina layer, which phase may be constituted by a cerium oxide, in particular ceria ($CeO_2$), followed by platinum and rhodium.

The automobile industry is researching more effective and cheaper catalytic systems for exhaust silencers to satisfy the ever more strict rules and regulations relating to depollution of exhaust gases from combustion engines and, of course, to satisfy economic demands.

The problem is thus to develop a new generation of catalytic system starting from an SiC foam as described in French application FR-A1-2 705 340, which catalytic system has both an improved technical performance and an economic advantage.

SUMMARY OF THE INVENTION

A first aim of the invention is to provide a catalyst support based on an SiC foam.

A second aim of the invention is to provide a process for the production of said support.

A third aim is to provide the corresponding catalytic system.

A fourth aim of the invention is to provide a process for the production of said catalytic system.

In a first aspect of the invention, the catalyst support comprises an SiC material in its divided and porous state and is characterized in that said material comprises a superficial layer of an oxygen donor oxide.

The SiC based material in its divided state is preferably a formed element of SiC foam with a specific surface area of at least 5 $m^2/g$, as described for example in French patent application FR-A1-2 705 340 cited above. The divided state of the SiC constituting the foam contributes to the high specific surface area of the foam; further, the divided state is essential to capture of the superficial oxygen donor oxide layer.

The term oxygen donor oxide means a metal oxide with a difference (t) from the stoichiometry of the global formula of said oxides. In other words, an oxide with global formula $M_xO_y$ may produce oxides with formula $M_xO_{y-t}$. Its role is to regulate the oxygen potential during catalytic reactions.

The oxygen donor oxide generally comprises metal oxides with at least two oxidation numbers but which remain in the oxide form and do not form carbides during the catalysed reactions which take place in the catalytic converter of the present invention.

These oxides are generally those of metals from group 3 of the periodic classification of the elements, i.e., Sc, Y, the lanthanides and actinides, preferably rare earth oxides and more particularly cerium, such as ceria $CeO_2$, or mixed oxides of rare earths such as misch metal.

The oxides can also be those of metals from both columns 7, 8, 9, 10 and 11 and rows 5 and 6, for example oxides of Pt, Rh, Pd, which are henceforth termed so-called precious metals.

We have, surprisingly, discovered that depositing a superficial layer of an oxygen donor oxide, in particular cerium, can simultaneously achieve the following effects:
- good direct adherence of the layer to the SiC support material in its divided state;
- a large increase in the specific surface area;
- good adherence for the subsequent deposit of the catalytically active phase.

Figure 1:
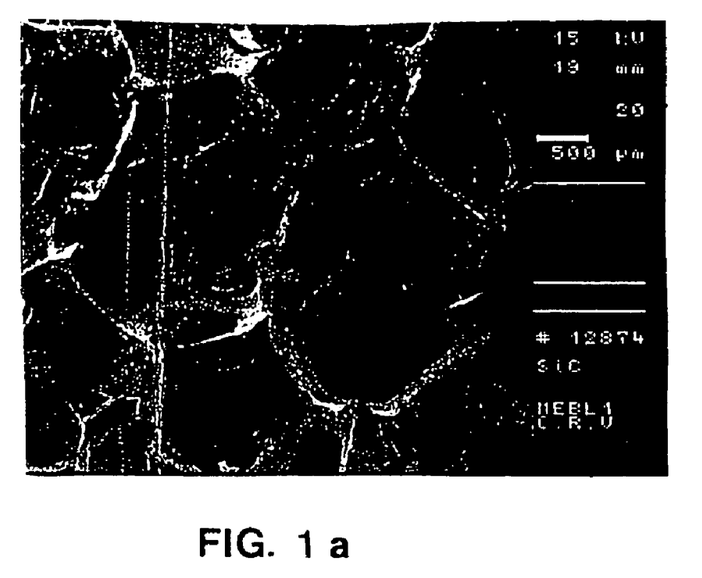
FIGS. 1a to 1d are photographs of the SiC material used in the examples. The scale shown on the right hand side is 500 μm for FIG. 1a, 20 μm for FIG. 1b, 10 μm for FIGS. 1c and 5 μm for FIG. 1d.
Figure 1C:
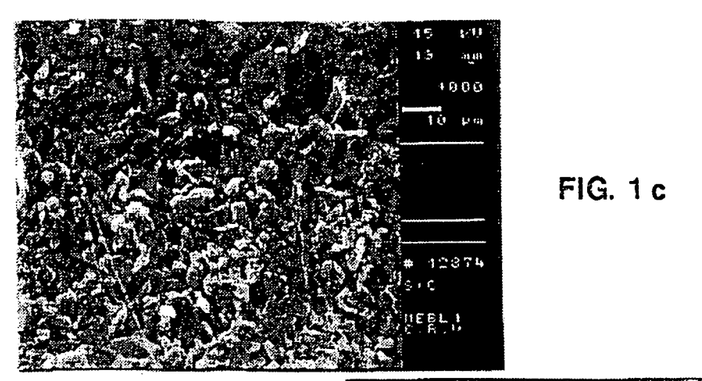
Figure 1D:
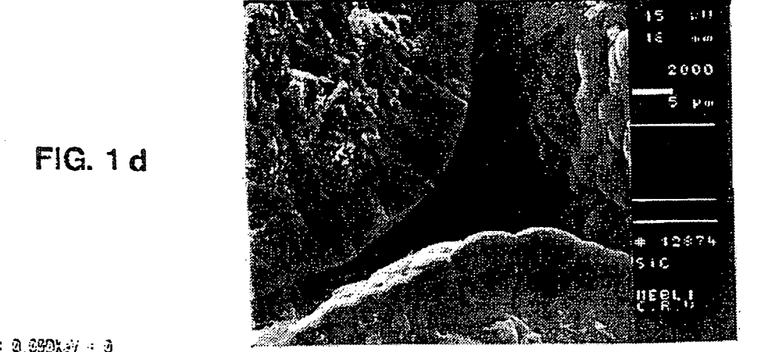
Figure 2:
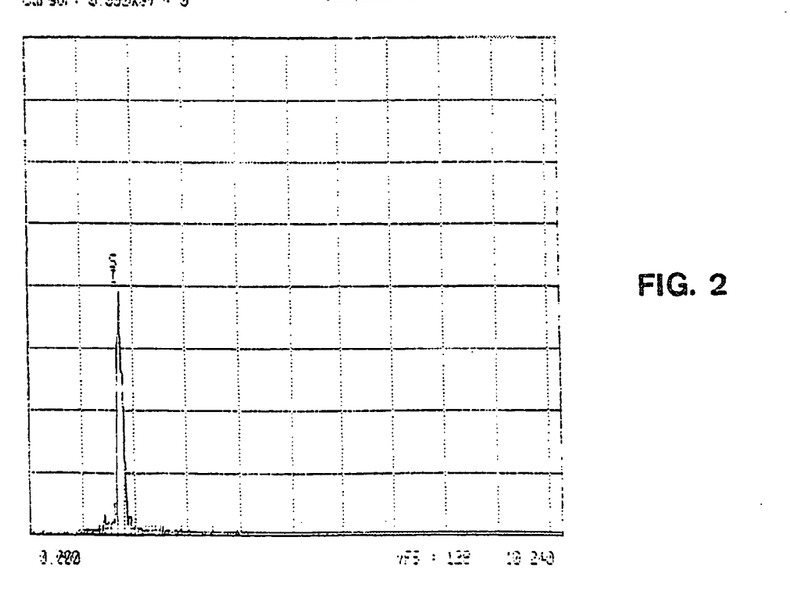
FIG. 2 is an X ray fluorescence spectrum showing the peak corresponding to the element Si.
Figure 3:
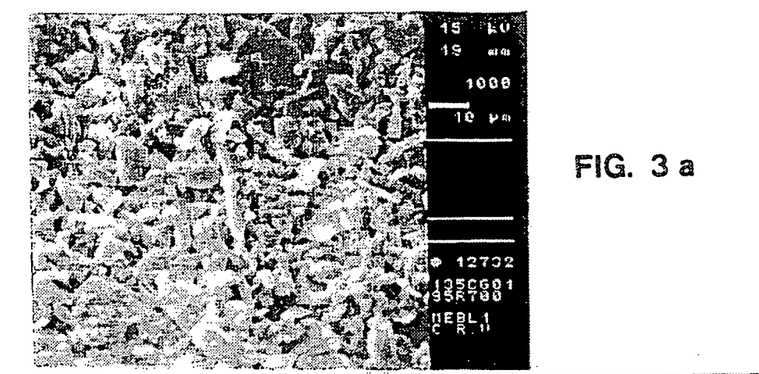
FIGS. 3a and 3b are analogous to FIGS. 1c and 1d.
Figure 4:
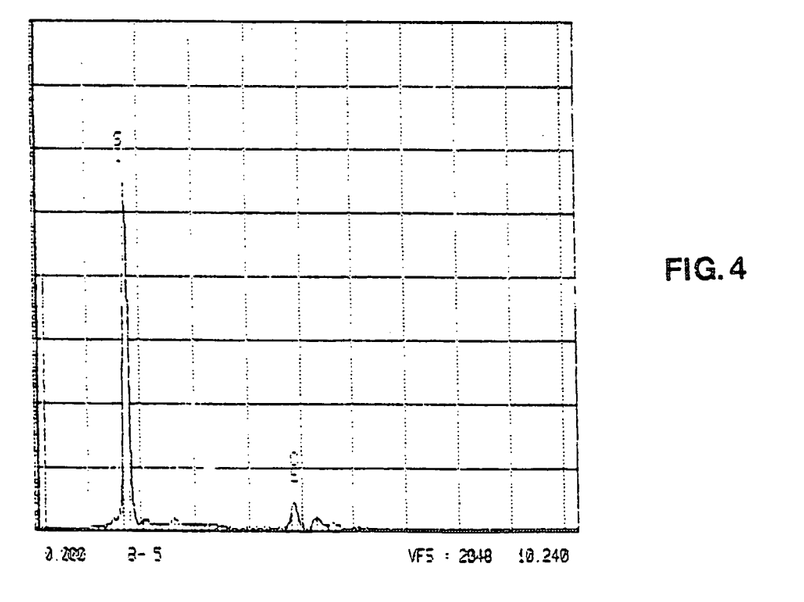
FIG. 4 is an X ray fluorescence spectrum showing the presence of a peak corresponding to the element Si and a lower peak corresponding to the element Ce.
Figure 5:
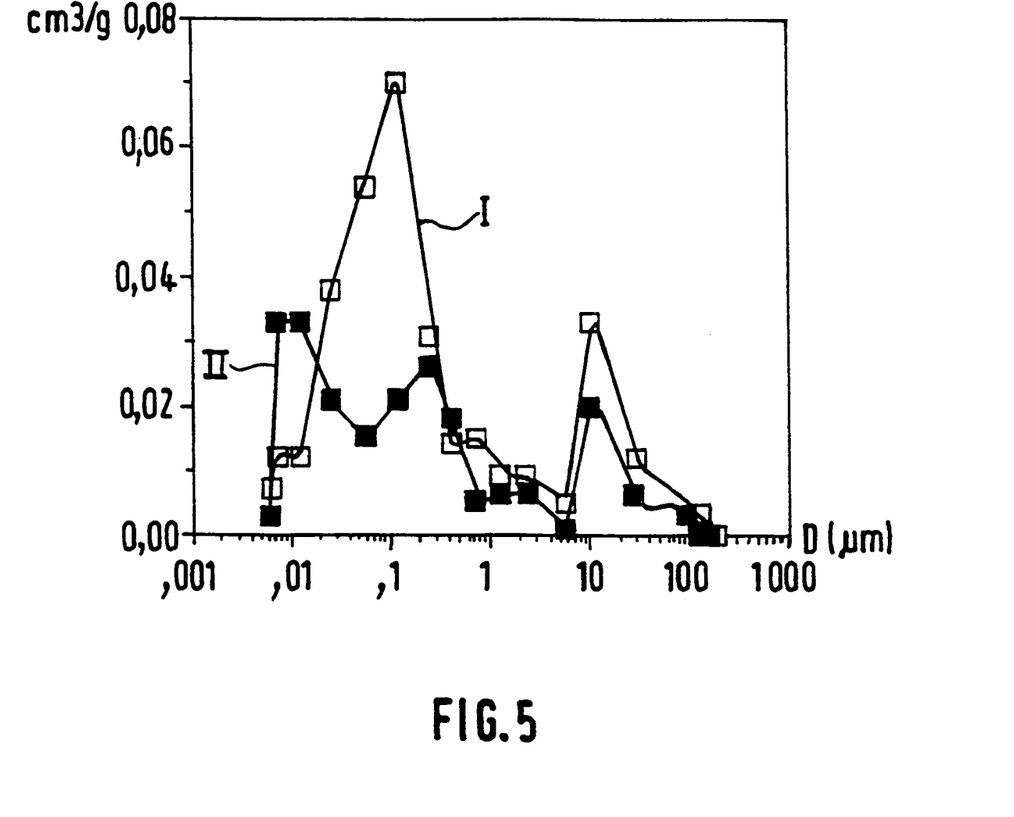
FIG. 5 is a pore spectrum with the pore diameter in μm along the abscissa and the pore volume in $cm^3/g$ up the ordinate.

The good adherence can be deduced from porosity measurements using mercury (see FIG. 5 for ceria) which show that the oxide (ceria) is deposited into all the porosity of the high specific surface area SiC support with a thickness which is of the order of several hundredths of μm. As shown in FIG. 5, the SiC foam support has two ranges of porosity: macropores of 10 to 100 μm, and mesopores of 0.007 to 0.1 μm. The addition of ceria does not modify the macropores. In contrast, deposition of the indicated thickness of ceria reduces the dimensions of the mesopores from initial dimensions in the range 0.04 to 0.1 μm to 0.007–0.02 μm.

Thus the divided SiC support, free of a wash coat, provides the specific surface area and produces good adherence of the catalytic phase, which can result in a high, stable catalytic activity during use as the oxide layer does not suffer any changes.

For comparison, it has been observed that impregnation of known commercially available cordierite supports without prior deposit of a wash coat based on alumina leads to the formation of 200 to 700 μm clusters of cerium oxide which then cannot effectively disperse the active catalytic phase; this is the reason in this case why prior formation of an alumina-based wash coat is indispensable to provide the specific surface area and adherence of the catalytic phase.

It has also been observed that impregnation of commercially available SiC foams with a low specific surface area (<2 $m^2/g$) cannot fix more than 3% by weight of ceria on the support, which prevents good catalytic activity.

In particular, it has been observed that, as shown in FIG. 5, with an SiC support in the absence of a superficial oxygen donor oxide layer, the specific surface area was much lower than when such a layer was present. Further, it has been observed that the presence of said superficial oxygen donor oxide layer alone serves to disperse an active catalytic phase in a well divided state effectively without formation of large clusters of low catalytic activity.

In accordance with the invention, the oxygen donor oxide/SiC ratio (in particular for cerium) is generally in the range 10% to 50% by weight with respect to the SiC, preferably 20% to 40%, for the more usual metals cited above. A reduction in catalytic activity has been observed for an oxide content of less than 10% by weight and the pores of the SiC foam become blocked for contents of more than 50% by weight.

This ratio can go down to 1% for some oxides, in particular those of the group of metals known as precious metals.

In accordance with the invention, the superficial oxygen donor oxide layer can comprise a stabilising agent for said oxide to avoid the risk of sintering, the content of which is in the range 0.1% to 5% by weight with respect to the oxide.

The stabilising agent can be selected from the elements Si, Al, Mg, Ca, Zr, La and/or oxides thereof: silica, alumina, magnesia, lime, zirconia, and lanthanum oxide.

As mentioned above, the presence of a superficial oxygen donor oxide layer in accordance with the invention has been observed to lead to a large increase in the specific surface area of the support of the invention. Thus the specific surface area of the final support of the invention is generally in the range 1.5 to 4 times that of the starting SiC material in its divided state.

This specific surface area is related to the pore spectrum of the support, as shown in FIG. 5 (curve II) for ceria: the bimodal pore spectrum has a macroporosity range of 5 to 100 μm and a mesoporosity range of 0.007 to 0.5 μm. Other spectra, which may be shifted to smaller dimensions, can be obtained starting from a finer SiC support.

In a second aspect, the invention provides a process for the production of the support of the invention, in which:

a) a solution of a precursor of the oxygen donor oxide is prepared;
b) said SiC material in its divided state is impregnated with said solution;
c) the excess of said solution is separated;
d) said impregnated material is calcined at a temperature which is at least equal to the decomposition temperature of said precursor but lower than the sintering temperature of said oxide, to form a layer of said oxide on said SiC material in its divided state.

The solution is preferably an aqueous solution, preferably a nitrate. For cerium, the precursor is a cerous salt which is soluble in water, with an oxidation number of +III, preferably a cerous nitrate: calcining thus produces ceria.

In step c) of the process, the excess of said solution is advantageously separated by centrifugation.

In general, steps a), b) and c) of said process are carried out at a controlled temperature, the temperature being in the range 15° C. to 70° C.

The oxygen donor oxide/SiC ratio can be varied by adjusting the concentration of the oxide precursor solution in step a), preferably between 20% by weight and the solubility limit of the precursor in said solution, and/or, in step c), by separating the excess to a greater or lesser extent.

In a third aspect, the invention provides a catalytic system comprising an active catalytic phase deposited on the catalyst support of the invention.

The active catalytic phase normally comprises a metal or a mixture of precious metals such as platinum and/or palladium, and rhodium, to form a catalytic system for exhaust silencers, but it can contain other catalytically active elements. In the case of platinum/rhodium, the platinum content in the catalytic system is in the range 0.05% to 3% by weight with respect to the weight of the catalytic system, and the rhodium content is in the range 0.01% to 3% by weight.

In a fourth aspect, the invention provides a process for the production of said catalytic system of the invention, comprising the following steps:

1) depositing said active phase comprising, for example, platinum and rhodium, on said catalytic support using any known method from a solution of precursors;
2) separating said catalytic support from the excess of said solution, preferably by drying;
3) heat treating said catalytic support on which said precursor solution has been deposited, at a temperature which is greater than the decomposition temperature of said precursors of platinum and rhodium, to form said catalytic phase.

The platinum precursor solutions are preferably solutions of chloroplatinic acid $H_2PtCl_6$ or platinum II amine $Pt(NH_3)_2Cl_2$ and in which the rhodium precursor solutions are solutions of a rhodium salt with oxidation number +III selected from chlorides, nitrates and sulphates.

The platinum concentration in said precursor solution is in the range 20 mg/l to 60 g/l and the rhodium concentration in said precursor solution is in the range 20 mg/l to 60 g/l. The ratio (by weight) of Pt/Rh to the active phase deposited on the support is generally in the range 3 to 6.

Unexpectedly, it has been discovered that the catalytic metal phase is better dispersed when deposition on the catalytic support is carried out by adsorption of the platinum and rhodium in the form of anionic or cationic species in solution, for which purpose the surface of said support will have been respectively positively or negatively charged on said catalytic support by selecting a pH for said solution which is lower or higher than the isoelectric point of said hydrated oxygen donor oxide. The isoelectric point is defined as the pH corresponding to the absence of charge at the surface of the hydrated oxygen donor oxide in solution.

Figure 6B:
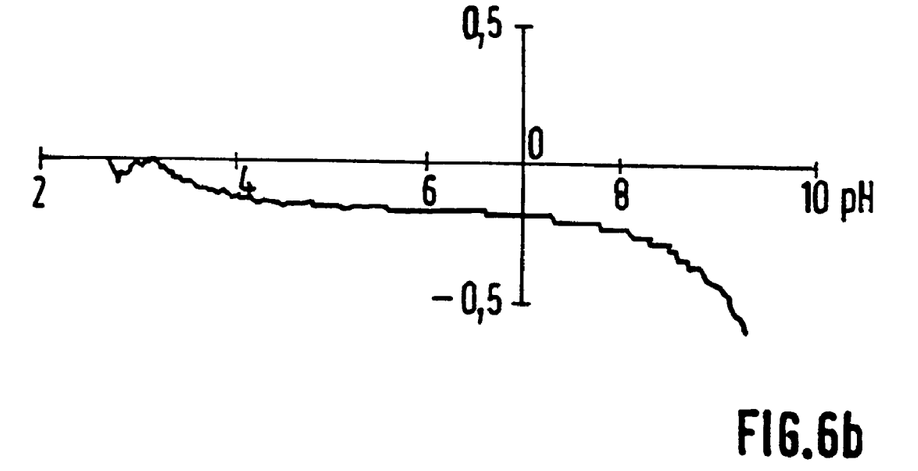
FIGS. 6b and 6c are curves showing the surface charge (up the ordinate—arbitrary units) as a function of pH (along the abscissa).
Figure 6C:
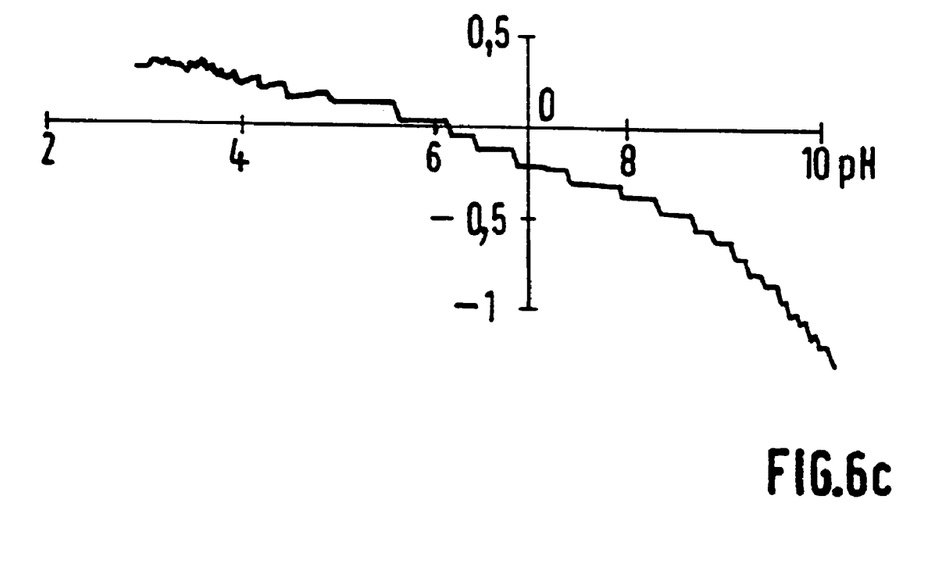

As shown in FIGS. 6b and 6c for cerium, which show the surface charge as a function of pH, it is clear that, in contrast to the case of a simple SiC support, an SiC support which has been treated in accordance with the invention by deposition of ceria leads (FIG. 6c) to a support for which the isoelectric point is close to 6, and it is possible to select one or another adsorbed anionic or cationic species containing the precious metal, while a simple SiC support, with an isoelectric point of the order of 2, presents a much narrower breadth of choice.

In order to vary the weight content of platinum and/or rhodium, the concentrations of the platinum and/or rhenium precursors in the precursor solutions are varied and/or, in step 2) of the process, the excess is separated to a greater or lesser extent.

BRIEF DESCRIPTION OF THE DRAWINGS

It should be noted that FIG. 1c relates to a "planar" portion while FIG. 1d relates to a combination of "planar" or "cylindrical" surfaces as can be seen in the enlargement in FIG. 1b.

The remaining figures relate to the catalyst support of the invention for ceria:

curve 1, with open squares, with higher peaks, is for an SiC support before deposition of the oxygen donor oxide layer;

curve II, with solid squares, is for the same support coated with ceria as described in the examples; its distribution includes very small pores, in particular around 0.01 µm, which generates a very high specific surface area.

FIG. 6b relates to an SiC support and FIG. 6c relates to an SiC support which has been treated in accordance with the invention, with deposition of ceria.

DESCRIPTION OF THE PREFERRED EMBODIMENTS

If the present invention is compared with the closest and best performing currently available technique constituted by cordierite supports coated with an alumina layer on which a ceria layer and an active catalytic phase are deposited, and the corresponding catalytic systems, in particular those using Pt—Rh, the following principal advantages of the invention can be observed:

- because the support of the invention contains no alumina (wash coat), which is known to undergo gradual sintering at the operating temperatures of the catalytic converter, thus reducing its efficiency, the support of the invention ensures that the catalytic system has a much longer lifetime due to the absence of sintering, in particular in the case of ceria.
- the particularly favourable hydrodynamics of the support for catalysis of depollution reactions means that the catalytic system of the invention, comprising for example Pt—Rh and intended for the treatment of exhaust gases, has a volume which is 30% lower for the same catalytic activity than the prior art catalytic system with a cordierite support, which is of particular advantage as regards the quality/price ratio.
- finally, it has been observed that, surprisingly and fundamentally with regard to recycling of materials, precious metals such as Pt—Rh can be recovered more easily, more economically and particularly effectively.

One characteristic of the invention is that the deposition of an active metal on the support can be recovered by means of simple lixiviation by bringing the catalytic system of the invention into contact with a hot concentrated acid solution (HCl, $HNO_3$, . . . ). This operation means that almost all of the precious metals, i.e., at least 98% thereof, can be recovered, typically in less than a day. The solution obtained, further, is readily recyclable to carry out a fresh deposition of Pt—Rh, because of the high purity of the precious metals it contains.

As a comparison, with a prior art cordierite based catalytic system comprising an alumina-based wash coat, the cordierite support must be completely dissolved because of the formation of very stable species of Pt and Rh, in particular Rh, with the alumina, which formation encourages the gradual sintering of the alumina, and thus results in increased consumption of the reactant. In addition, the presence of the wash coat on the cordierite causes large filtration problems when recycling the precious metals.

EXAMPLES

Example 1

A complete catalytic system was produced from a block of SiC foam with a volume of 1.4 l. The foam was produced as described in Example 5 (test 4) of FR-A1-2 705 340. The SiC foam had a specific surface area of 14.2 $m^2/g$ and a pore distribution (pore spectrum) as shown in FIG. 5 (curve 1).

Ceria Impregnation Step

The SiC block was immersed in two liters of a 55% by weight aqueous solution of hexahydrated cerous nitrate $(Ce(NO_3)_3,6H_2O)$. The ensemble was kept immersed and degassed under partial vacuum for 10 minutes. The block was then separated from the solution, drained and dried by centrifugation. The weight of the wet block impregnated with cerous salt was 263 g. The deposited salt was thermally decomposed by slowly heating the impregnated block to 450° C. and maintaining that temperature for 3 hours. At the end of that step, a catalyst support was obtained which was composed of an SiC foam with a ceria layer representing 18.6% of the total weight of the final support. The specific surface area was 24.5 $m^2/g$, i.e., 1.72 times the specific surface area of the starting support. The pore spectrum corresponded to curve II of FIG. 5 and had a maximum in the 0.007 µm–0.01 µm zone.

Impregnation of Active Phase Metals

The catalytic support obtained above (SiC foam and ceria) was then immersed in two liters of an aqueous solution containing 16.6 g/l of platinum in the form of chloroplatinic acid and 4.2 g/l of rhodium in the form of rhodium nitrate. This ensemble was degassed under partial vacuum and kept immersed for ten minutes. The support was then separated from the solution, drained and dried by centrifugation. The weight of the wet impregnated support was 251 g. The platinum and rhodium salts were decomposed by heat treatment with a gradual rise in temperature to 400° C. and maintaining that temperature for 3 hours.

A complete catalytic system was thus obtained which was constituted by an SiC foam coated with a ceria layer (18.6% of the total weight) which acted as a support for the dispersed precious metals Pt and Rh (Pt: 0.86% of the total weight, and Rh: 0.21% of the total weight).

Precious Metal Recovery Step

The catalytic system comprising the ceria layer and the precious metal coating was coarsely ground then brought into contact with a boiling mixture of 50% of 53% nitric acid and 50% of 36% hydrochloric acid. 36% hydrochloric acid was added in successive fractions until the nitrates had completely decomposed. After 5 hours, a suspension of SiC in a solution of chloroplatinic acid and rhodium chloride was obtained. After cooling, easy filtration and washing the solid residue, recovered as a whole, X ray fluorescence measurements showed that the residue contained less than 0.1% of platinum; the solution (filtrate) recovered by lixiviation contained 97% of the initially deposited platinum (this percentage could have been increased by improving the washing); the results obtained for the rhodium were equivalent: the solution was directly recyclable to form a new deposit.

It should be noted that in the case of a cordierite support, recovery of the precious metals by lixiviation using the same acids led to partial dissolution of the cordierite and great difficulties with filtration (presence of colloids) due to the existence of the wash coat which did not allow a material balance to be obtained.

Example 2

This example illustrates the process of the adsorption of Pt and Rh in the form of anionic species to allow better distribution of the metal catalytic phase by means of controlling the pH during the SiC foam immersion step.

A catalytic support composed of an SiC foam and a ceria layer (24.9% by weight) was prepared as described in Example 1, up to the ceria impregnation step. The specific surface area of the support was 27.9 m²/g. A 2.5 g sample was removed from this support.

Precious Metal Adsorption Step

The sample was immersed for 24 hours in 100 ml of a solution which was stirred and circulated in which the concentrations of Pt and Rh were fixed initially and in which the pH was regulated so as to obtain adsorption of anionic species on the positively charged support as follows:

initial conditions:
Pt: 0.514 g/l (in the form of chloroplatinic acid)
Rh: 0.266 g/l (in the form of rhodium chloride)
pH conditions:
The pH was kept between 3.1 and 3.5 by addition of ammonia or nitric acid.

The surface charge curves of FIGS. 6b and 6c show that, for a support which was free of ceria (FIG. 6b), it was not possible to obtain a positively charged surface for pH values of 3.1 to 3.5, the conditions which are necessary to obtain the desired anionic species simultaneously. In contrast, the complete SiC support with deposited ceria could produce positive surface charges under these pH conditions (FIG. 6c).

After 24 hours, the support was separated from the solution and simply drained. Measurement of the Pt and Rh remaining in the solution (0.43 g/l for Pt, 0.219 g/l for Rh) meant that the quantities deposited on the support could be calculated. The deposited salts were then thermally decomposed by gradually increasing the temperature to 400° C. followed by maintaining that temperature for three hours.

A complete catalytic system had thus been produced, constituted by an SiC foam coated with a ceria layer (24.9% of the total weight) acting as a support for the precious metals Pt and Rh (Pt: 0.33%±0.02 of the total weight, and Rh: 0.19%±0.01 of the total weight). The catalytic system obtained had excellent catalytic activity compared to the commercially available systems using the same precious metals supported by cordierite with a wash coat, and excellent resistance to sintering. This good catalytic activity, better than that obtained from Example 1, can be explained by better dispersion obtained by bringing ionic interactions into play for depositing the precious metals. It was also observed that the precious metal distribution was very homogeneous despite the absence of drying, which absence is generally the cause of accumulation on decanting the catalytic phase. Further, in contrast to the impregnation step of Example 1, this adsorption technique means that dilute recycled solutions of Pt and Rh salts can be used.

After using the catalytic system, the support underwent lixiviation to recover the precious metals deposited, using the operating protocol described in Example 1. Analysis of the lixiviate (after filtration and washing) enabled the following lixiviation yields to be calculated:

$$\frac{Pt \text{ recycled}}{Pt \text{ initial}} = 100 \pm 2\%$$

$$\frac{Rh \text{ recycled}}{Rh \text{ initial}} = 100 \pm 2\%$$

Example 3

This example illustrates the production of a support of the invention comprising a mixed oxygen donor oxide layer comprising a mixture of $CeO_2$ and $ZrO_2$, the latter acting as an oxygen donor and stabilising additive.

The support was produced from an SiC foam block with a volume of 1.4 l, the foam being manufactured as described in Example 5 (test 4) of FR-A1-2 705 340. This foam had a specific surface area of 12.3 m²/g.

Ceria Impregnation Step

The SiC block was immersed in two liters of a 45% by weight aqueous solution of hexahydrated cerous nitrate $Ce(NO_3)_3,6H_2O$ and 8% by weight of pentahydrated zirconium nitrate $Zr(NO_3)_4,5H_2O$. The ensemble was kept immersed and degassed under partial vacuum for 10 minutes. The block was then separated from the solution, drained and dried by centrifugation. The weight of the wet block impregnated with cerous salt was 252 g. The deposited salt was thermally decomposed by slowly heating the impregnated block to 550° C. and maintaining that temperature for 3 hours. At the end of that step, a catalyst support was obtained which was composed of an SiC foam with a mixed layer of ceria and zirconia containing 16.4% of ceria and 2.4% of zirconia, with respect to the total weight of the final support. The specific surface area was 23.5 m²/g, i.e., 1.91 times the specific surface area of the starting support.

Such a support has the advantage of stabilising the surface during use. As described in Examples 1 and 2, this support can be covered with active phase and treated for recovery thereof.

What is claimed is:

1. A catalyst support comprising a support of SiC foam in a divided and porous state having a specific surface area of at least 5 m²/g, with a surface of SiC having thereon a superficial layer comprising an oxygen donor oxide,
   wherein the superficial layer resides directly on the surface of SiC without an intermediate wash coat.

2. A support according to claim 1, wherein the oxygen donor oxide is an oxide of at least one metal from group 3 of the periodic classification of the elements.

3. A support according to claim 2, wherein the oxygen donor oxide is a cerium oxide or an oxide of a mixture of rare earths.

4. A support according to claim 1, wherein the oxygen donor oxide is an oxide of at least one metal found in both group 7, 8, 9, 10 or 11 and row 5 or 6, of the periodic classification of elements.

5. A support according to claim 1, wherein the oxygen donor oxide is present in an amount of more than 1% by weight with respect to the SiC support.

6. A support according to claim 1, wherein the superficial oxygen donor oxide layer comprises a stabilizing agent for said oxide in an amount of 0.1% to 5% by weight with respect to said oxygen donor oxide.

7. A support according to claim 6, wherein said stabilizing agent is selected from the group consisting of Si, Al, Mg, Ca, Zr, La, silica, alumina, magnesia, lime, zirconia, lanthanum oxide and mixtures thereof.

8. A support according to claim 1, having a specific surface area in the range 1.5 to 4 times that of said SiC foam in its divided state.

9. A support according to claim 1, having a bimodal pore spectrum with a macroporosity range of 5 to 100 μm and a mesoporosity range of 0.007 to 0.5 μm.

10. A process for the production of a support according to of claim 1, comprising the steps of:
    a) preparing a solution of a precursor of the oxygen donor oxide;

b) impregnating said SiC foam in its divided state with said solution;

c) separating excess of said solution; and d) calcining said impregnated foam at a temperature which is at which said precursor decomposes but lower than a temperature at which said oxide sinters, to form a layer of said oxide on said SiC foam in its divided state.

11. A process according to claim 10, wherein said solution is an aqueous solution and said precursor is a cerium salt which is soluble in water.

12. A process according to claim 11, wherein said salt is a cerous nitrate.

13. A process according to claim 10, wherein the excess of said solution is separated by centrifugation.

14. A process according to claim 11, wherein the cerium oxide/SiC ratio is varied by at least one of the steps of:

in step a) of the process, changing the concentration of the cerium oxide precursor in said solution between 20% by weight and the solubility limit of said precursor in said solution, and in step c) of the process, changing the degree to which said excess is separated.

15. A catalytic system comprising an active catalytic phase comprising one or more active catayltic elements, deposited on said catalyst support according to claim 1.

16. A catalytic system according to claim 15, wherein said active catalytic phase is selected from the group consisting of platinum, palladium, rhodium and mixtures thereof, to form a catalytic system for the treatment of exhaust gases.

17. A catalytic system according to claim 16, wherein said catalytic system contains platinum in the range 0.05% to 3% by weight, and rhodium in the range 0.01% to 3% by weight.

18. A catalytic system according to claim 16, containing Pt and Rh in a weight ratio in the range of 3 to 6.

19. A process for the production of said catalytic system according to claims 15, comprising the steps of:

a) preparing a solution of a precursor of the oxygen donor oxide;

b) impregnating said SiC foam in its divided state with said solution;

c) separating excess of said solution;

d) calcining said impregnated foam at a temperature which is at which said precursor decomposes but lower than a temperature at which said oxide sinters, to form a layer of said oxide on said SiC foam in its divided state;

e) depositing said active phase comprising at least one active catalyst element from a precursor solution thereof;

f) separating said catalytic support from excess precursor solution;

g) heat treating said catalytic support on which said precursor solution has been deposited, at a temperature which is greater than that at which the precursor decomposes, to form said active catalytic phase.

20. A process according to claim 19, wherein the active elements are platinum and rhodium.

21. A process according to claim 19, wherein, in step e), said deposition is carried out by adsorption of the at least one active element in the form of anionic or cationic species in solution on said support, the surface of which has been respectively positively or negatively charged by selecting a pH for said solution which is lower or higher than the isoelectric point of the hydrate of said oxygen donor oxide.

22. A process according to claim 19, wherein the at least one active element is varied in weight content by at least one step of:

changing concentrations of said precursor in the solutions and, changing the amount of separation of said excess.

23. A process for recovering the catalytic phase based on precious metals in the catalytic system of claim 15, comprising treating said catalytic system by coarse grinding, lixiviation using a hot concentrated acid, then filtering to obtain a solution of at least one catalyst metal.

24. A support according to claim 2, wherein the metal is a rare earth metal.

25. A support according to claim 4, wherein the at least one metal is selected from the group consisting of Pt, Rh and Pd.

26. A support according to claim 5, wherein the oxygen donor oxide is present in an amount of 10 to 50% by weight.

* * * * *